Feb. 21, 1950      A. V. PEDERSEN      2,498,180
WOOD JOINT

Filed May 31, 1946

INVENTOR.
AXEL V. PEDERSEN
BY Hazard and Miller
Attorneys

Patented Feb. 21, 1950

2,498,180

UNITED STATES PATENT OFFICE 2,498,180

WOOD JOINT

Axel V. Pedersen, Los Angeles, Calif.

Application May 31, 1946, Serial No. 673,335

5 Claims. (Cl. 20—92)

This invention relates to improvements in wood joints, and may be regarded as an improvement over the disclosure made in my copending application (now abandoned) Serial No. 516,067, filed December 29, 1943, entitled Truss construction.

In the above-mentioned application there is disclosed a joint for use in joining the adjacent ends of adjacent lamination sections that are used in the construction of roof trusses, arches, and the like, wherein the adjacent ends of adjacent lamination sections each have two tongues disposed in side by side relationship and which are oppositely scarfed with scarfs of considerable slope, the preferred slope being in excess of 1:6. By having the adjacent ends of adjacent lamination sections so formed glue may be applied to the scarfs and the lamination sections assembled together in end to end relationship. The slope of the oppositely scarfed tongues is such that bending moments may be readily transmitted thereacross long prior to the setting of the glue. Consequently, in the construction of the curved upper chord of a truss or in the construction of an arch the lamination sections having the oppositely scarfed tongues may have the glue applied thereto and can be assembled together. The lamination sections can then be immediately bent around a form to the desired shape without waiting for the glue to set inasmuch as the scarfed tongues are capable of transmitting these bending moments and will not open materially event though subjected to bending. When the glue has dried between the laminations and between the scarfed tongues the chord or arch is completed and is highly advantageous in that bending stresses are transmitted across the joint without depending upon the structural strength of the glue to any great degree.

It is of importance in assembling laminations having oppositely scarfed tongues of this character that the joint be fully assembled. That is, that the adjacent laminations should be forced towards each other until their scarfed tongues are completely in mutual engagement. If the laminations are not fully brought together leaving the joint loose stresses in the structure cannot be transmitted fully across the joint due to the looseness. On the other hand, if the laminations are forced together with too great a force the oppositely scarfed tongues may have a tendency to split the lamination or to at least prestress it in an undesirable manner.

An object of the present invention is to provide an improved joint of this character wherein the adjacent ends of adjacent laminations each has a pair of oppositely scarfed tongues adapted to engage the complementary tongue on the adjacent section and which is provided with an abutment between the tongues. This abutment performs the function of preventing the joint from being forced together beyond the point designed so that there is no danger of splitting the lamination or prestressing it and also serves as an indicator indicating that the joint when assembled is fully made up. That is, the tongues are brought together to the proper point where there is no looseness in the joint.

With the foregoing and other objects in view, which will be made manifest in the following detailed description and specifically pointed out in the appended claims, reference is had to the accompanying drawings for an illustrative embodiment of the invention, wherein:

Figure 1:
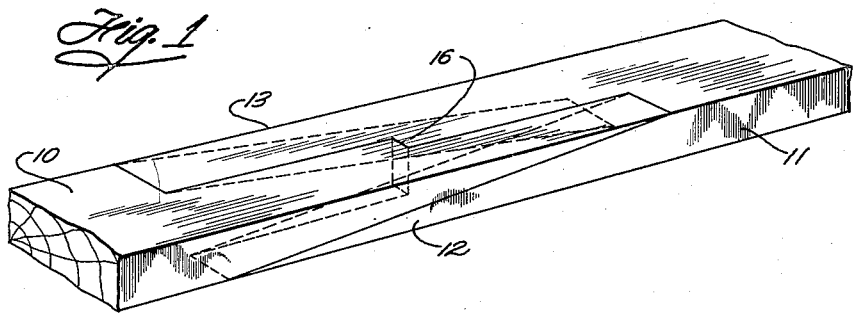
Figure 1 is a perspective view of the improved wood joint in its fully made up or closed condition.
Figure 2:
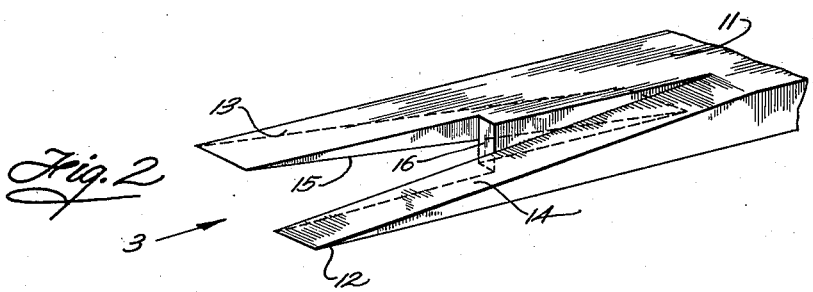
Fig. 2 is a perspective view of one of the ends of the adjacent lamination sections making up the joint illustrated in Fig. 1.
Figure 3:
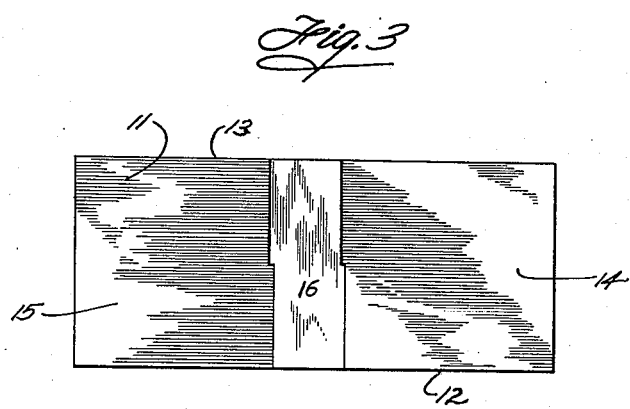
Fig. 3 is a view in end elevation taken substantially in the direction of the arrow 3 upon Fig. 2.

Referring to the accompanying drawings wherein similar reference characters designate similar parts throughout, 10 and 11 indicate the adjacent ends of two lamination sections such as are employed in the construction of roof trusses, arches, and other structural elements. Each of these lamination sections has its end shaped to provide two tongues, the tongues on the section 11 being indicated at 12 and 13. The tongue 12 has its upper side or face scarfed or sloped as indicated at 14 from the top surface of the lamination section down to the bottom surface of the lamination section. In a similar manner the bottom surface of the tongue 13 is scarfed as indicated at 15 in the opposite direction from the top surface of the lamination section to the bottom surface thereof. These tongues, instead of being disposed in side by side relationship as disclosed in my copending application, are somewhat spaced from each other and intermediate their lengths preferably at the longitudinal centers of the tongues there is a vertical abutting surface 16 extending from top to bottom of the lamination section. The lamination section 10 has its end formed in identically the same manner.

As set forth in my copending application the slopes of the scarfs are preferably in the neighborhood of 1:6 and while the exact slope of the scarf may vary at all events the slope should not be as steep as 45°. When the scarfs are so steeply sloped I find that the joint is incapable of transmitting bending stresses prior to the time that the glue has set and has bonded the scarfed tongues together.

In making up a curved structural element such as an arch or top chord of a truss the lamination sections have glue applied to their top and bottom and to the scarfed surfaces at 14 and 15. The sections may then be assembled together by merely forcing one lamination section 10 longitudinally toward its companion lamination section 11. This forcing movement is continued until the opposed abutting surfaces 16 are in mutual engagement. When these surfaces mutually engage they prevent the joint from being brought together any tighter and thus preventing any danger of splitting the lamination sections or prestressing the wood thereof. As long as the abutting surfaces 16 are not in mutual engagement the slight space therebetween indicates that the joint has not been fully closed or brought together. Consequently, any space between the abutting surfaces functions as an indicator that the sections 10 and 11 should be forced together with great effort so that opposed scarfed surfaces will be brought into firm mutual engagement between which the glue may form a very strong adhesive bond. After the sections have been thus assembled together they may be immediately placed on a bending form and bent immediately to the required shape. This may be performed long prior to the setting or drying of the glue inasmuch as the shape of the scarfed ends renders the joint capable of transmitting bending moments despite the presence or absence of the glue. The joint will not open even though subjected to bending although the extreme ends of the tongues may under extreme conditions tend to separate from the opposed lamination section. However, as the laminations are stacked one against the other in forming an arch or top chord of a truss and the joints are normally staggered any tendency of the extreme ends of the tongues to separate is corrected by the overlying center portion of the overlying lamination. When the glue has set or dried the structure is completed and may be removed from the form.

While the improved joint has been primarily designed for use in the construction of arches and truss chords it will be appreciated that it may be advantageously employed wherever it is designed to connect the ends of two pieces of wood or planks in such a manner that bending stresses may be readily transmitted across the joint. The improved joint is highly advantageous in that the abutting surfaces at 16 between the tongues prevent the parts of the joint from being forced together to an excessive degree and serve as a readily visible indicator indicating whether or not the joint has been fully made up as designed. The abutting surfaces 16 which are in mutual engagement can, of course, transmit no great bending stresses and consequently the areas of these surfaces should be kept relatively small as compared with the entire cross-sectional areas of the lamination. Any adequate area that will serve as a positive abutment preventing the joint from being forced together excessively and which will indicate whether the joint has not been brought together adequately will suffice.

From the above-described construction it will be appreciated that a novel, simple, and advantageous wood joint is provided which can be easily constructed and which greatly facilitates the proper assembly of this type of joint.

Various changes may be made in the details of construction without departing from the spirit and scope of the invention as defined by the appended claims.

I claim:

1. A wood joint wherein the adjacent ends of adjacent sections each have upwardly and downwardly scarfed tongues, and abutments arranged between the tongues limiting the extent to which the ends may be forced together to have their scarfed surfaces mutually engageable.

2. A wood joint wherein the adjacent ends of adjacent sections each have upwardly and downwardly scarfed tongues, said tongues being laterally spaced from each other, there being mutually engageable surfaces between the scarfed tongues on each end adapted to engage to limit the extent to which the ends may be forced together and to serve as an indicator indicating when the joint has been inadequately assembled.

3. A wood joint wherein adjacent ends of adjacent sections have upwardly and downwardly scarfed tongues, the scarfs extending diagonally from the front of each of the members to the back of the member and from the back of each of the members to the front of the member, said tongues being laterally spaced from each other, there being mutually engageable surfaces between the scarfed tongues on each end adapted to limit the extent to which the ends may be forced together and to serve as an indicator indicating when the joint has been inadequately assembled, said engaging surfaces being located between the beginning of the scarfs and the end of the scarfs.

4. A wood joint wherein adjacent ends of adjacent sections have upwardly and downwardly scarfed tongues, and abutments arranged between the tongues limiting the extent to which the ends may be forced together to have their scarfed surfaces mutually engageable, said abutments being located so that the tongues on opposite members slide by the abutments when the members are placed together.

5. A wood joint wherein adjacent ends of adjacent sections each have upwardly and downwardly scarfed tongues, and abutments arranged between the tongues limiting the extent to which the ends may be forced together to have their scarfed surfaces mutually engageable, the abutments extending substantially perpendicular to the members and extending from one side of each member to the other side of the member.

AXEL V. PEDERSEN.

REFERENCES CITED

The following references are of record in the file of this patent:

UNITED STATES PATENTS

| Number | Name | Date |
|---|---|---|
| 757,812 | Keyes | Apr. 19, 1904 |
| 1,413,395 | Donnelly | Apr. 18, 1922 |
| 1,500,808 | Fuhrmann | July 8, 1924 |

FOREIGN PATENTS

| Number | Country | Date |
|---|---|---|
| 83,257 | Switzerland | 1920 |